(12) United States Patent
Arora et al.

(10) Patent No.: US 12,216,644 B1
(45) Date of Patent: Feb. 4, 2025

(54) ADAPTIVE ARTIFICIAL INTELLIGENCE (AI) ENGINE FOR SECURE ORCHESTRATION OF NODES IN A DISTRIBUTED LEDGER HIERARCHY

(71) Applicant: Bank of America Corporation, Charlotte, NC (US)

(72) Inventors: Saurabh Arora, Gurugram (IN); Sandeep Chauhan, Hyderabad (IN); Anil Gajula, Hyderabad (IN); Jhalak Khurana, Haryana (IN)

(73) Assignee: Bank of America Corporation, Charlotte, NC (US)

(*) Notice: Subject to any disclaimer, the term of this patent is extended or adjusted under 35 U.S.C. 154(b) by 0 days.

(21) Appl. No.: 18/410,305

(22) Filed: Jan. 11, 2024

(51) Int. Cl.
*G06F 16/23* (2019.01)
*G06N 20/00* (2019.01)

(52) U.S. Cl.
CPC ......... *G06F 16/2379* (2019.01); *G06N 20/00* (2019.01)

(58) Field of Classification Search
CPC .............................. G06F 16/2379; G06N 20/00
USPC ........................................................ 707/703
See application file for complete search history.

(56) References Cited

U.S. PATENT DOCUMENTS

| | | | |
|---|---|---|---|
| 11,416,510 B2 | 8/2022 | Farver et al. | |
| 11,477,022 B1 * | 10/2022 | Harold | G06F 16/1815 |
| 11,477,266 B1 | 10/2022 | Paczkowski et al. | |
| 11,729,084 B1 * | 8/2023 | Jaisawal | H04L 9/50 709/224 |
| 11,765,230 B2 | 9/2023 | Sulibhavi et al. | |
| 11,797,866 B2 | 10/2023 | Harrison et al. | |
| 11,860,753 B1 * | 1/2024 | Boss | G06F 11/3006 |
| 2017/0279818 A1 * | 9/2017 | Milazzo | G06F 21/564 |
| 2019/0097807 A1 * | 3/2019 | Mahanta | H04L 9/0637 |
| 2020/0019898 A1 * | 1/2020 | Harrison | G06N 20/10 |
| 2020/0327137 A1 | 10/2020 | Farver et al. | |
| 2021/0287117 A1 | 9/2021 | Dastmalchi et al. | |
| 2021/0383468 A1 | 12/2021 | Faye et al. | |
| 2022/0067738 A1 | 3/2022 | Fang et al. | |
| 2022/0114273 A1 | 4/2022 | Njemanze | |
| 2022/0138550 A1 | 5/2022 | Zhang et al. | |
| 2022/0237477 A1 | 7/2022 | Tamilselvam et al. | |
| 2022/0309080 A1 | 9/2022 | Xiao et al. | |
| 2022/0318270 A1 | 10/2022 | Safary et al. | |
| 2022/0318648 A1 | 10/2022 | Safary et al. | |
| 2022/0358030 A1 | 11/2022 | Yanamala et al. | |
| 2022/0358031 A1 | 11/2022 | Yanamala et al. | |

(Continued)

*Primary Examiner* — Cam Linh T Nguyen
(74) *Attorney, Agent, or Firm* — Banner & Witcoff, Ltd.

(57) ABSTRACT

A computing platform may train, using historical ledger information and historical node confidence information, an adaptive AI engine to output, for a given input node, a particular distributed ledger to which the given input node should be added. The computing platform may receive a request to add a first node to a ledger. The computing platform may input first node information into the adaptive AI engine, which may cause the adaptive AI engine to output a node addition score indicating a first distributed ledger corresponding to an information type of the request. Based on identifying that the node addition score meets or exceeds a node addition threshold, the computing platform may cause the first node to be added to the first distributed ledger. The computing platform may update, using a dynamic feedback loop and based on the node addition score, the adaptive AI engine.

20 Claims, 12 Drawing Sheets

(56) References Cited

U.S. PATENT DOCUMENTS

| | | |
|---|---|---|
| 2022/0405061 A1 | 12/2022 | Jariwala |
| 2022/0407912 A1 | 12/2022 | Paczkowski et al. |
| 2023/0093309 A1* | 3/2023 | Manningham ...... G06F 16/2365 |
| | | 707/703 |
| 2023/0135632 A1 | 5/2023 | Smolen et al. |
| 2023/0188600 A1 | 6/2023 | Sulibhavi et al. |
| 2024/0232891 A1* | 7/2024 | Ahuja .................. G06Q 20/405 |
| 2024/0259208 A1* | 8/2024 | Manamohan ......... H04L 9/3236 |

* cited by examiner

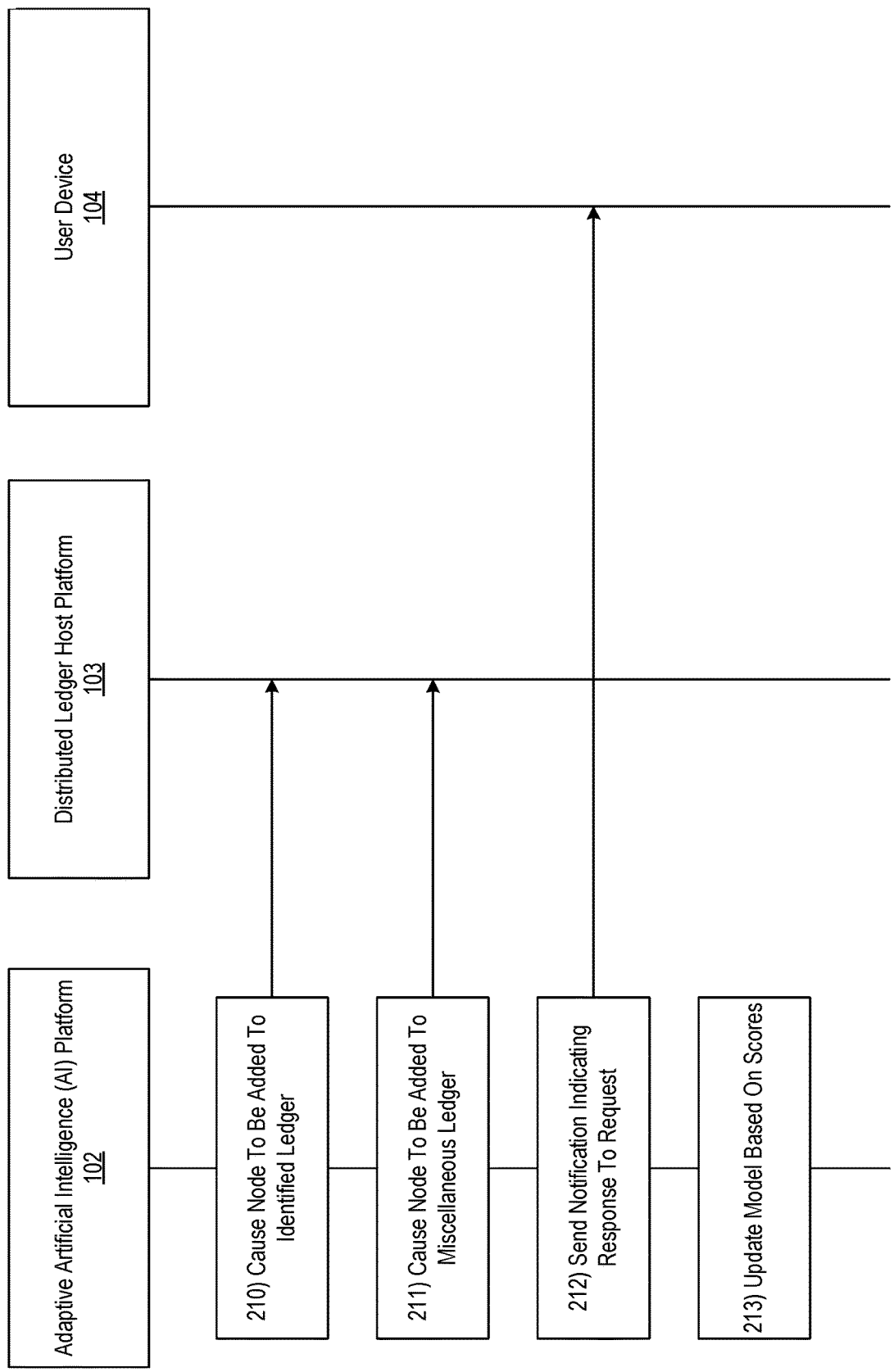

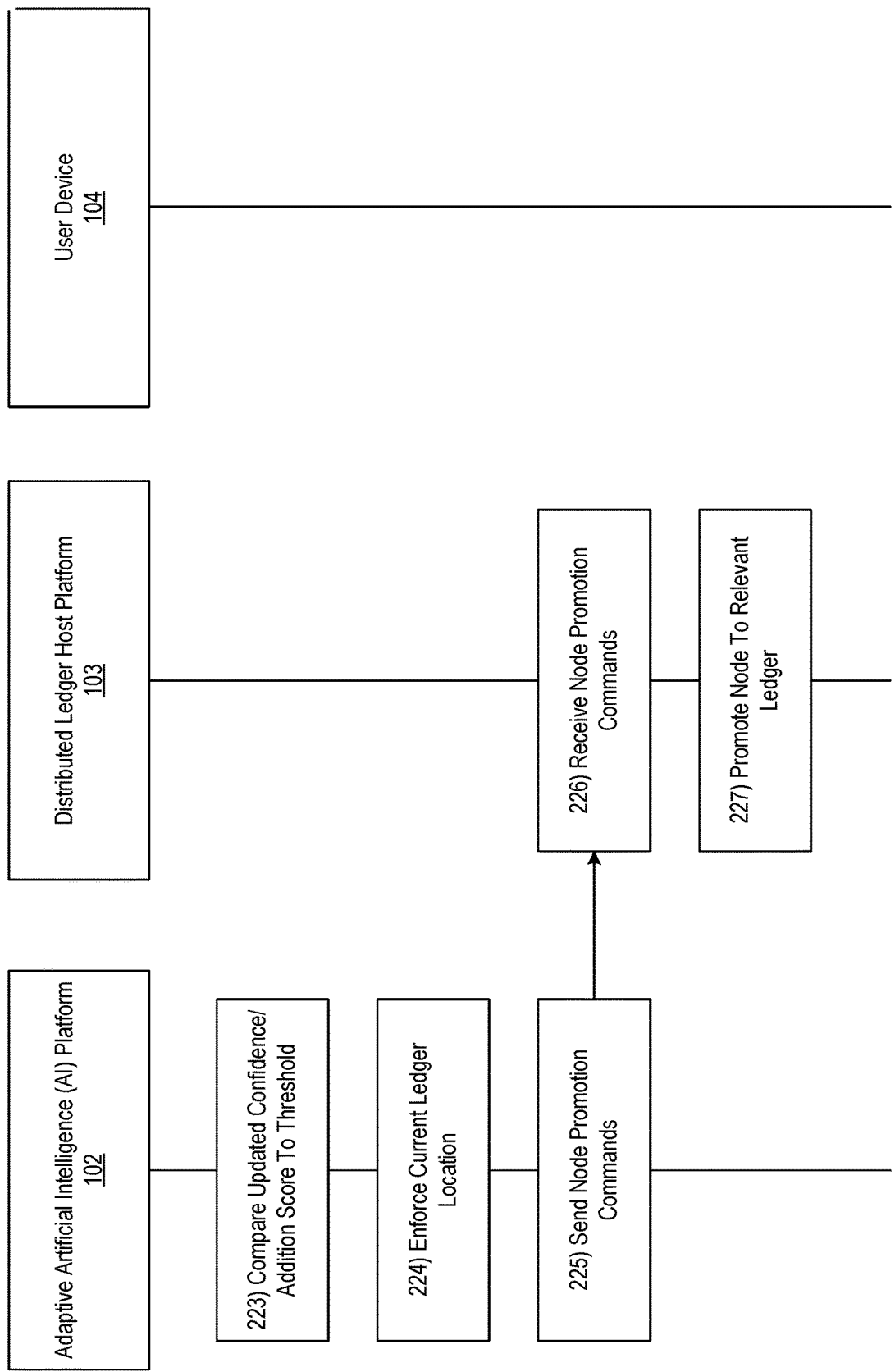

605

Node Addition Response

The requested node has failed the addition evaluation. Would you like to resubmit for re-consideration?

| Yes | No |

FIG. 6

ADAPTIVE ARTIFICIAL INTELLIGENCE (AI) ENGINE FOR SECURE ORCHESTRATION OF NODES IN A DISTRIBUTED LEDGER HIERARCHY

BACKGROUND

In some instances, enterprise organizations may utilize distributed ledgers to store information. For example, different categorized ledgers may be used for the storage of information in different categories. There may be certain challenges, however, associated with the use of such categorized ledgers. For example, the enterprise might not dynamically understand which ledger should be used for particular information. Similarly, because security levels of each ledger may differ, the addition of information to an incorrect ledger may have significant consequences if the information is malicious, untrusted, and/or otherwise corrupted (e.g., if a node associated with the information is malicious, untrusted, and/or otherwise corrupted). Because information in each ledger is linked to the remaining information in that ledger, any issues may permeate throughout the given ledger. Furthermore, the status (e.g., trustworthiness, categorization, or the like) of a given node may change over time, and thus static monitoring and/or addition of the information from that node to a particular ledger may likewise negatively affect the corresponding distributed ledger.

SUMMARY

Aspects of the disclosure provide effective, efficient, scalable, and convenient technical solutions that address and overcome the technical problems associated with securely accepting and orchestrating nodes in distributed ledgers. In accordance with one or more embodiments of the disclosure, a computing platform comprising at least one processor, a communication interface, and memory storing computer-readable instructions may train, using historical ledger information and historical node confidence information, an adaptive artificial intelligence (AI) engine, which may configure the AI engine to output, for a given input node, a particular distributed ledger of a plurality of distributed ledgers, to which the given input node should be added. The computing platform may receive a request to add a first node to one of the plurality of distributed ledgers. The computing platform may input first node information, of the first node, into the adaptive AI engine, which may cause the adaptive AI engine to output a node addition score indicating a first distributed ledger, of the plurality of distributed ledgers, corresponding to an information type of the request. The computing platform may compare the node addition score to a node addition threshold, which may be specific to the first distributed ledger. Based on identifying that the node addition score meets or exceeds the node addition threshold, the computing platform may cause the first node to be added to the first distributed ledger. The computing platform may update, using a dynamic feedback loop and based on the node addition score, the adaptive AI engine.

In one or more instances, the historical ledger information may include information indicating ledgers on which historical requests from various nodes are processed. In one or more instances, the historical node confidence information may indicate, for various nodes, one or more of: results of previous interactions of the various node, formats of information sent by the various nodes, indications of malware sent by the various nodes, indications of unrequested files being sent, validity of requests from the various nodes, encryption associated with the requests from the various nodes, or node behavior information.

In one or more examples, the plurality of distributed ledgers may include: 1) at least one category specific ledger, where entries to the at least one category specific ledger are specific to a particular information type, and 2) a miscellaneous ledger, where entries to the miscellaneous ledger correspond to a plurality of different information types. In one or more examples, the first node information may include an IP address of the first node.

In one or more instances, generating the node addition score may include: 1) generating a confidence score for the first node, where the confidence score may indicate a representation of confidence that the first node comprises a secure node, 2) identifying a likelihood that the first node should be added to a particular distributed ledger, and 3) generating a combined score based on the confidence score and the likelihood. In one or more instances, after adding the first node to the first distributed ledger, the computing platform may continue monitoring of the first node by: 1) generating an updated addition score for the first node, 2) comparing the updated addition score to the node addition threshold, 3) based on identifying that the updated addition score meets or exceeds the node addition threshold, reinforcing a location of the first node in the first distributed ledger, and 4) based on identifying that the updated addition score fails to meet or exceed the node addition threshold, demoting the first node from the first distributed ledger to a miscellaneous distributed ledger.

In one or more examples, generating the updated addition score comprises one or more of: 1) reclassifying the first node to a different information type, wherein the different information type corresponds to a different distributed ledger, or 2) identifying that a trustworthiness of the first node has changed. In one or more examples, the computing platform may monitor a second node of a miscellaneous distributed ledger. The computing platform may generate an updated node addition score for the second node. The computing platform may compare the updated addition score for the second node to the node addition threshold. Based on identifying that the updated addition score meets or exceeds the node addition threshold, the computing platform may promote the second node from the miscellaneous distributed ledger to the first distributed ledger. Based on identifying that the updated addition score of the second node fails to meet or exceed the node addition threshold, the computing platform may reinforce a location of the second node in the miscellaneous ledger. In one or more instances, the computing platform may dynamically adjust nodes of the first distributed ledger based on current processing load corresponding to the first distributed ledger by: 1) moving the first node from the first distributed ledger to a miscellaneous distributed ledger, or 2) moving a second node, from the miscellaneous distributed ledger, to the first distributed ledger.

BRIEF DESCRIPTION OF DRAWINGS

The present disclosure is illustrated by way of example and is not limited in the accompanying figures in which like reference numerals indicate similar elements and in which:

FIGS. 2A-2F depict an illustrative event sequence for using adaptive AI to securely orchestrate nodes in a distributed ledger hierarchy in accordance with one or more example embodiments.

FIG. 6 depicts an illustrative user interface for using adaptive AI to securely orchestrate nodes in a distributed ledger hierarchy in accordance with one or more example embodiments.

DETAILED DESCRIPTION

Figure 1A:
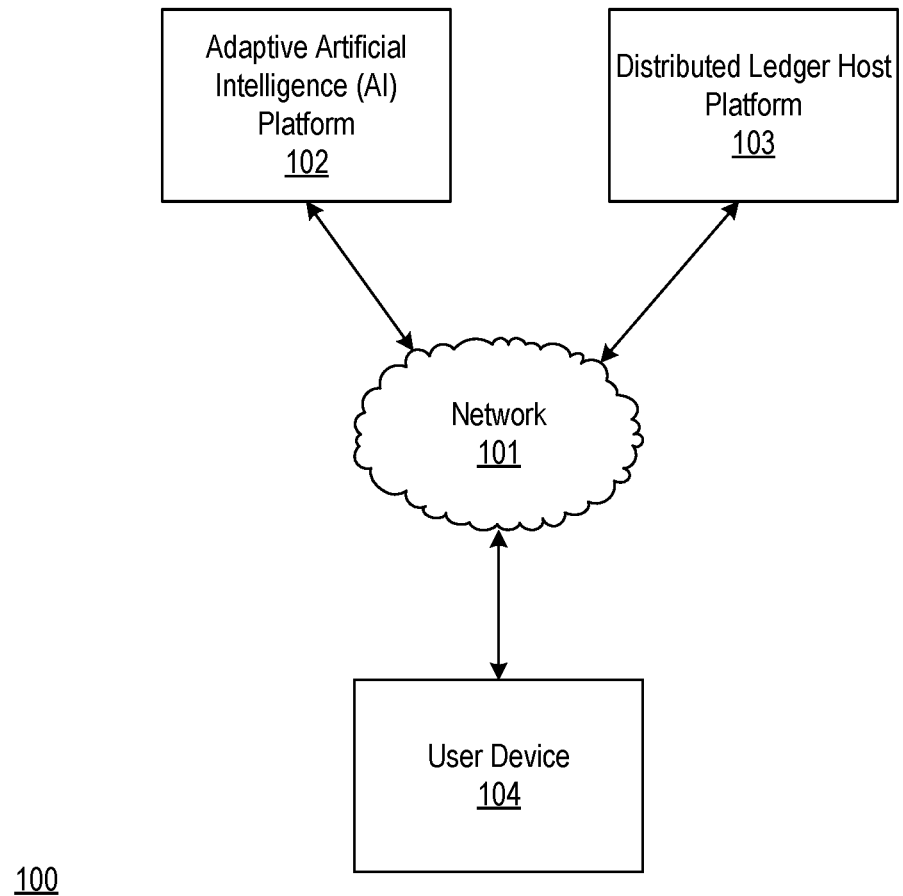
FIGS. 1A and 1B depict an illustrative computing environment for using adaptive AI to securely orchestrate nodes in a distributed ledger hierarchy in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

The following description relates to using adaptive AI to securely orchestrate nodes in a distributed ledger hierarchy. For example, with more enterprise level applications adopting to distributed ledgers for various data needs, security for data chains may take more priority. Secured data chains at an enterprise level may be broken down to multiple smaller sub data chains against data categories that they capture and rotate which could be transactional data chains, operational data chains, or more (and security levels may be accordingly decided).

There may be certain challenges even with categorized data chains. For scaling needs, every new node may need to be dynamically understood (e.g., which category to add it to, whether existing nodes in specific categories have feedback on accepting/rejecting the particular new node, or the like). Further, it may be advantageous to allow nodes in miscellaneous data chains, and to periodically extract and transfer respective data to a primary data chain. It may be advantageous to provide a method to promote/demote nodes from miscellaneous data chains to primary data chains and vice versa per nodes' behavior/data exchange in miscellaneous chains and respective data chains. It may also be advantageous to provide a method to find dependency confidence from existing chain nodes and additional scores for identified new nodes, which may be subjected to addition in organizational node management hierarchies. It may be advantageous to adapt to a node's behavior in certain enterprise context and influence the decision in positive and miscellaneous categories.

Accordingly, described herein is a mechanism to dynamically categorize new nodes to their respective data hierarchies with positive and miscellaneous orchestration of nodes leveraging adaptive AI and influence engineering to move nodes across hierarchies. A new node may be determined for a respective hierarchy of transactional data versus operational data and other defined categories. A respective chain from step one may feed dependency confidence (per module dependency and previous data exchanges with nodes in context) and to help calculate an addition score that would further influence the decision of addition. Influence engineering may decide where the new node is pushed in an organizational node structure, per score. The system may decide whether a node can be positively added to a data chain directly or if it needs to be moved to miscellaneous chain for it to be considered for the primary data chain. Data that gets added to the miscellaneous chain may be rotated and shuffled for movement from the miscellaneous chain to the primary data chain. Node behavior/data exchange consistency may be monitored (with adaptive AI) and it may be promoted from a miscellaneous chain to a transactional or operational data chain and demoted to a miscellaneous chain in case of faulty/missed rules.

Accordingly, described herein is a unique way to accept and orchestrate nodes and securely push specific nodes across an organization data chain hierarchy. This method is unique in adapting to node's behavior leveraging adaptive AI based scoring methods for a node to be accepted in primary versus miscellaneous sets of data chains. The system may be capable of promoting and demoting nodes per their behavior in respective data chain hierarchies, and ensuring data security per classification of data it serves. Influence engineering capabilities may be achieved for decisioning of positive and miscellaneous node additions for additional node behavior validation and preventing faulty nodes from getting added to primary data chains and still allowing new nodes into the system without affecting the whole chain.

These and other features are described in greater detail below.

Figure 1B:
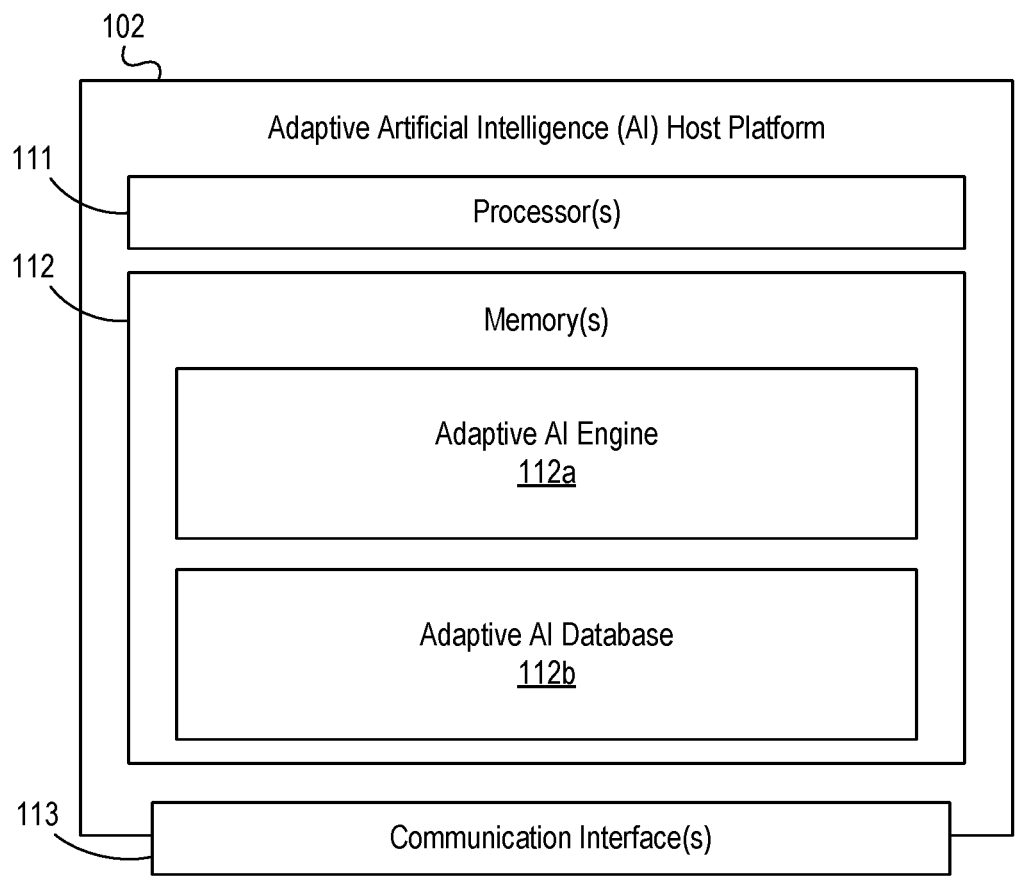

FIGS. 1A-1B depict an illustrative computing environment for using adaptive AI to securely orchestrate nodes in a distributed ledger hierarchy in accordance with one or more example embodiments. Referring to FIG. 1A, computing environment 100 may include one or more computer systems. For example, computing environment 100 may include adaptive AI platform 102, distributed ledger host platform 103, and user device 104.

Adaptive AI platform 102 may include one or more computing devices (servers, server blades, or the like) and/or other computer components (e.g., processors, memories, communication interfaces, or the like). For example, the adaptive AI platform 102 may be configured to train, host, and apply an adaptive AI engine configured to categorize nodes (e.g., computing devices, or the like) to a particular categorized and/or miscellaneous ledger, identify a trustworthiness of such nodes, and cause the node to be dynamically added, promoted, demoted, and/or otherwise positioned within a distributed ledger.

Distributed ledger host platform 103 may be or include one or more computing devices (e.g., servers, server blades, or the like) and/or other computer components (e.g., processors, memories, communication interfaces, or the like). For example, distributed ledger host platform 103 may be configured to establish, store, and/or otherwise maintain a plurality of distributed ledgers. For example, the distributed ledger host platform 103 may maintain one or more categorized distributed ledgers (e.g., storing information for a particular category/of a particular information type) and a miscellaneous ledger (e.g., storing information for a plurality of different categories that has not be verified and/or otherwise validated for addition into a categorized distributed ledger). In some instances, the distributed ledger host platform 103 may maintain a different level of security for each of the categorized distributed ledgers.

User device 104 may be or include one or more devices (e.g., laptop computers, desktop computer, smartphones, tablets, and/or other devices) configured for use in providing model supervision. For example, the user device 104 may be used to send information and/or requests to be processed by the distributed ledger host platform 103. In some instances, the user device 104 may be a node that may be used to provide and/or validate information for addition to a distributed ledger. Any number of such user devices may be used to implement the techniques described herein without departing from the scope of the disclosure.

Computing environment 100 also may include one or more networks, which may interconnect adaptive AI platform 102, distributed ledger host platform 103, and user device 104. For example, computing environment 100 may include a network 101 (which may interconnect, e.g., adaptive AI platform 102, distributed ledger host platform 103, and user device 104).

In one or more arrangements, adaptive AI platform 102, distributed ledger host platform 103, and user device 104 may be any type of computing device capable of receiving a user interface, receiving input via the user interface, and communicating the received input to one or more other computing devices, and/or training, hosting, executing, and/or otherwise maintaining one or more machine learning models. For example, adaptive AI platform 102, distributed ledger host platform 103, user device 104, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of adaptive AI platform 102, distributed ledger host platform 103, and user device 104 may, in some instances, be special-purpose computing devices configured to perform specific functions.

Referring to FIG. 1B, adaptive AI platform 102 may include one or more processors 111, memory 112, and communication interface 113. A data bus may interconnect processor 111, memory 112, and communication interface 113. Communication interface 113 may be a network interface configured to support communication between adaptive AI platform 102 and one or more networks (e.g., network 101, or the like). Memory 112 may include one or more program modules having instructions that when executed by processor 111 cause adaptive AI platform 102 to perform one or more functions described herein and/or one or more databases that may store and/or otherwise maintain information which may be used by such program modules and/or processor 111. In some instances, the one or more program modules and/or databases may be stored by and/or maintained in different memory units of adaptive AI platform 102 and/or by different computing devices that may form and/or otherwise make up adaptive AI platform 102. For example, memory 112 may have, host, store, and/or include adaptive AI engine 112a and adaptive AI database 112b. Adaptive AI engine 112a may have instructions that direct and/or cause adaptive AI platform 102 to execute advanced techniques to securely orchestrate nodes in a distributed ledger hierarchy. For example, the adaptive AI engine 112a may train, deploy, and/or otherwise refine modes through both initial training and one or more dynamic feedback loops which may, e.g., enable continuous improvement of the models and further optimize the models for performing secure node orchestration. Adaptive AI database 112b may store information that may be used by the adaptive AI host platform 102 and/or adaptive AI engine 112a to securely orchestrate nodes in a distributed ledger hierarchy.

Figure 2A:
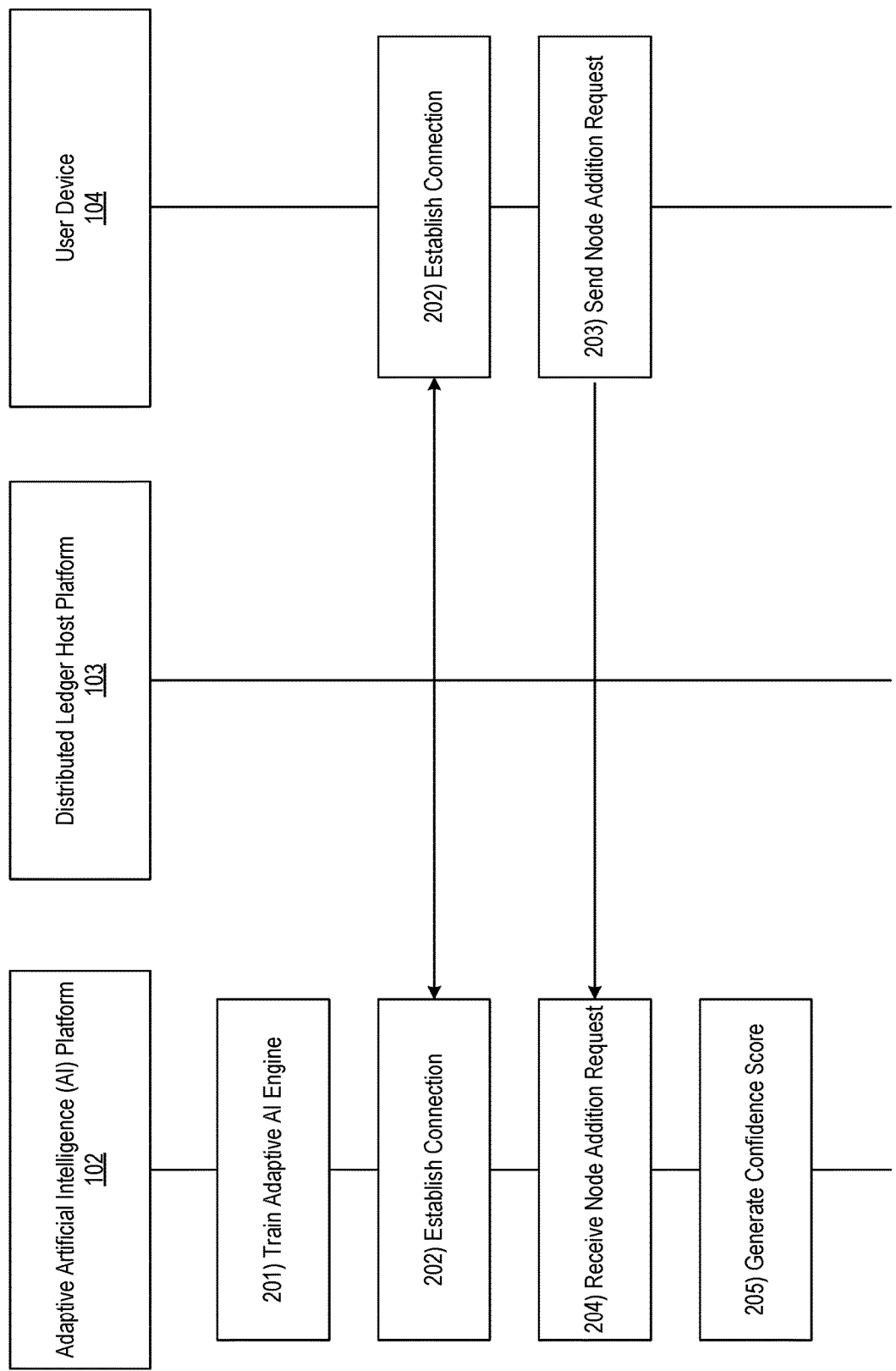

FIGS. 2A-2F depict an illustrative event sequence for using adaptive AI to securely orchestrate nodes in a distributed ledger hierarchy in accordance with one or more example embodiments. Referring to FIG. 2A, at step 201, the adaptive AI platform 102 may train an adaptive AI engine. For example, the adaptive AI platform 102 may train the adaptive AI engine to produce confidence scores and/or addition scores for various distributed ledger nodes (e.g., computing devices). For example, these confidence scores may represent a trustworthiness of a particular node. The addition scores may represent how confident the adaptive AI engine is that a particular node should be associated with a particular distributed ledger (e.g., a specific categorized ledger directed to information of a particular type).

In some instances, to perform such training, the adaptive AI platform 102 may receive historical ledger information indicating distributed ledgers on which historical requests from various nodes are processed and/or otherwise stored, types of requests associated with the various nodes, and/or other information. For example, such information may be labelled based on the associated distributed ledger and/or node identification information. Additionally, the adaptive AI platform 102 may receive historical node confidence information from the various nodes, indicating results of previous interactions of the various node, formats of information sent by the various nodes, indications of malware sent by the various nodes, indications of unrequested files being sent, validity of requests from the various nodes, encryption associated with the requests from the various nodes, node behavior information, and/or other information that may be used to establish a trustworthiness of a given node. Such information may, for example, be labelled based on the corresponding node. By inputting this historical ledger information and historical node confidence information into the adaptive AI engine, the adaptive AI platform 102 may train the adaptive AI engine to establish correlations between nodes and both their corresponding trustworthiness and most relevant distributed ledger, which may, e.g., enable the adaptive AI engine to output scores representative of such trustworthiness (e.g., confidence scores) and whether or not a node should be added to a given distributed ledger (e.g., addition scores). In some instances, historical confidence scores and/or addition scores may further be input into the adaptive AI engine to further train the adaptive AI engine.

In some instances, in training the adaptive AI engine to generate the addition scores, the adaptive AI platform 102 may establish a stored relationship between the confidence scores and likelihoods of association between a given node and distributed ledger, which may be used to produce the addition scores. For example, the adaptive AI platform 102 may establish a stored correlation such as: (0.5*confidence score)+(0.5*likelihood of association)=addition score. In some instances, this weighting may be dynamically adjusted to modify how relevant the confidence score is to the addition score. In these instances, the confidence score, likelihood of association, and addition score may be values between 0 and 1 (inclusive). For example, if the adaptive AI engine identifies a confidence score of 1 for a particular node (e.g., indicating a highest degree of confidence) and a likelihood of association of 0.8 between the node and a first distributed ledger, the adaptive AI engine may output an addition score of 0.9.

In some instances, the adaptive AI engine may be trained to establish one or more confidence and/or addition thresholds, against which the confidence and/or addition scores may be compared (as is described further below). In these instances, for a new node (not yet added to a distributed ledger) if the confidence and/or addition scores meet or exceed the corresponding threshold, the node may be added to the corresponding distributed ledger (otherwise, the new node might not be added). For nodes already associated with a specific categorized ledger and/or the miscellaneous ledger, comparison to these thresholds may be used to promote and/or demote nodes between the ledgers, as is described further below. In some instances, the thresholds may be dynamically adjusted by the adaptive AI engine. Similarly, the adaptive AI engine may dynamically set ledger specific thresholds, which may, e.g., reflect varied levels of authentication, trustworthiness, security, or the like of the different distributed ledgers.

In some instances, in training the adaptive AI engine, adaptive AI platform 102 may use one or more supervised learning techniques (e.g., decision trees, bagging, boosting, random forest, k-NN, linear regression, artificial neural networks, support vector machines, and/or other supervised learning techniques), unsupervised learning techniques (e.g., classification, regression, clustering, anomaly detection, artificial neutral networks, and/or other unsupervised models/techniques), and/or other techniques.

At step 202, the user device 104 may establish a connection with the adaptive AI platform 102. For example, the user device 104 may establish a first wireless data connection with the adaptive AI platform 102 to link the user device 104 to the adaptive AI platform 102 (e.g., in preparation for sending node addition requests, or the like). In some instances, the user device 104 may identify whether a connection is already established with the adaptive AI platform 102. If a connection is already established with the adaptive AI platform 102, the user device 104 might not re-establish the connection. If a connection is not yet established with the adaptive AI platform 102, the user device 104 may establish the first wireless data connection as described herein.

At step 203, the user device 104 may send a node addition request to the adaptive AI platform 102. For example, the user device 104 may send a request provide information to, process information with, and/or otherwise interact with a distributed ledger. In some instances, the request may specify a particular distributed ledger. In other instances, the request might not specify the distributed ledger, and may instead provide information associated with the request. In some instances, the user device 104 may send the node addition request while the first wireless data connection is established.

At step 204, the adaptive AI platform 102 may receive the node addition request sent at step 203. For example, the adaptive AI platform 102 may receive the node addition request via the communication interface 113 and while the first wireless data connection is established. At step 205, the adaptive AI platform 102 may input information of the node (e.g., an internet protocol (IP) address, or the like) into the adaptive AI engine to generate a confidence score for the node. For example, the adaptive AI engine may use the IP address and/or other node information to identify historical node confidence information for the node, used to train the adaptive AI engine (e.g., at step 201). For example, the adaptive AI engine may identify results of previous interactions of the various nodes, formats of information sent by the node, indications of malware sent by node, indications of unrequested files being sent, validity of requests from the node, encryption associated with the requests from the node, node behavior information, and/or other information that may be used to establish a trustworthiness of the node, and may generate a numeric value (e.g., between 0 and 1, inclusive) representative of how trustworthy the node is (e.g., with 1 being the most trustworthy and 0 being the least). For example, as the incorporation of a node into a distributed ledger may have effects that permeate across other nodes of the ledger and/or information stored at the ledger itself, it may be of particular importance to verify, prior to incorporating the node into the ledger, whether there are any issues that would be cause for denying any interactions between the node and the ledger.

Figure 2B:
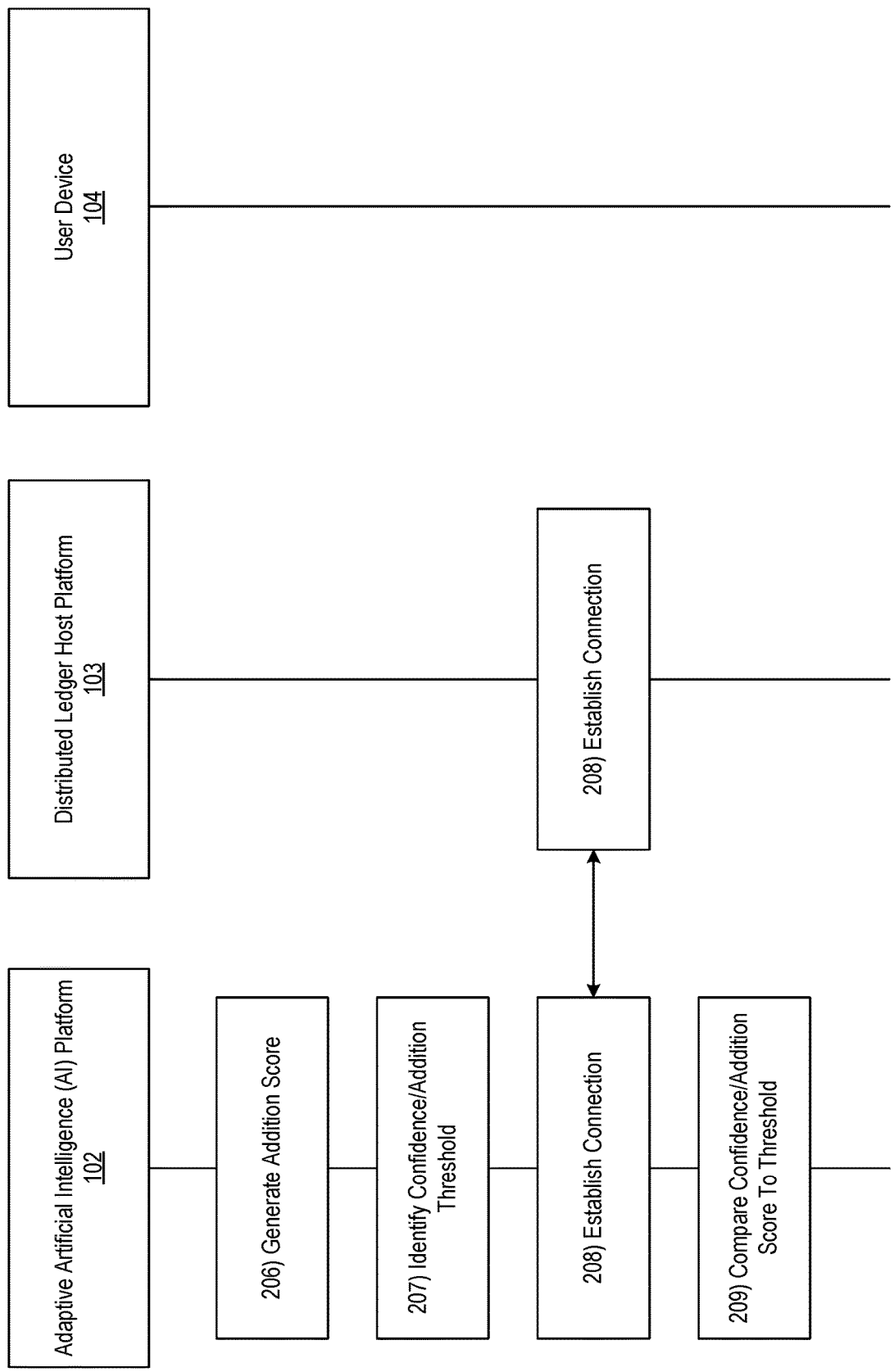

Referring to FIG. 2B, at step 206, the adaptive AI platform 102 may further use the adaptive AI engine to generate an addition score. For example, the adaptive AI platform 102 may use the IP address of the node to identify, based on the historical ledger information, distributed ledgers on which historical requests from the node are processed and/or otherwise stored, types of requests associated with the node, and/or other information, which may, e.g., provide insight into a category specific distributed ledger, to which the node would be added if approved. For example, the distributed ledger host platform 103 may maintain a plurality of different category specific ledgers corresponding to different categories of request (e.g., transactional requests, operational requests, or the like). Accordingly, the adaptive AI engine may identify a likelihood that the node should be associated with each category (e.g., a first likelihood that the node corresponds to a first category, a second likelihood that the node corresponds to a second category, or the like). The adaptive AI engine may select the highest likelihood, and then adjust it based on the confidence score, identified at step 205, to produce the addition score (e.g., using the relationship described above at step 201, or otherwise). In some instances, this addition score may be numeric value (e.g., between 0 and 1, inclusive) representative of how likely it is that the node may be added to a particular category specific ledger (e.g., with 1 being the most likely and 0 being the least).

At step 207, the adaptive AI engine may identify a confidence and/or addition threshold of the categorized distributed ledger associated with the addition score (generated at step 206). For example, the confidence and/or addition threshold may be unique to each of the categorized distributed ledgers, as each may be associated with information of varied security levels, risk tolerances, and/or otherwise. Accordingly, the adaptive AI engine may identify the relevant confidence and/or addition threshold to which the confidence score and/or addition score should be compared.

At step 208, the adaptive AI platform 102 may establish a connection with the distributed ledger host platform 103. For example, the adaptive AI platform 102 may establish a second wireless data connection with the distributed ledger host platform to link the adaptive AI platform 102 to the distributed ledger host platform 103 (e.g., in preparation for sending node addition and/or other instructions). In some instances, the adaptive AI platform 102 may identify whether or not a connection is already established with the distributed ledger host platform 103. If a connection is already established, the adaptive AI platform 102 might not re-establish the connection. If a connection is not yet established, the adaptive AI platform 102 may establish the second wireless data connection as described herein.

At step 209, the adaptive AI platform 102 may compare the confidence and/or addition scores to the confidence and/or addition thresholds identified at step 207. If the adaptive AI platform 102 identifies that the confidence and/or addition scores meet or exceed the confidence and/or addition thresholds, the adaptive AI platform 102 may proceed to step 210. Otherwise, the if the adaptive AI platform 102 identifies that the confidence and/or addition scores do not meet or exceed the confidence and/or addition thresholds, the adaptive AI platform 102 may proceed to step 211.

Referring to FIG. 2C, at step 210, the adaptive AI platform 102 may cause the node to be added to the identified category specific distributed ledger. For example, the adaptive AI platform 102 may send one or more instructions directing the distributed ledger host platform 103 to add the node to the category specific distributed ledger, which may, e.g., cause the distributed ledger host platform 103 to add the node accordingly (which may, e.g., enable the node to make requests to, access information at, provide validation interactions, and/or otherwise interact with the category specific distributed ledger). In some instances, the adaptive AI platform 102 may send the one or more instructions directing the distributed ledger host platform 103 to add the node to the category specific distributed ledger via the communication interface 113 and while the second wireless data connection is established. The adaptive AI platform 102 may then proceed to step 212.

At step 211, the adaptive AI platform 102 may cause the node to be added to the miscellaneous ledger at the distributed ledger host platform 103. For example, this miscellaneous ledger may include nodes corresponding to multiple different categories (e.g., in contrast to the category specific distributed ledgers). Nodes added to the miscellaneous ledger may be continuously monitored by the adaptive AI platform 102 to identify whether a confidence in the corresponding nodes has improved such that they may be promoted to a category specific distributed ledger. For example, the adaptive AI platform 102 may send one or more instructions directing the distributed ledger host platform 103 to add the node to the miscellaneous distributed ledger, which may, e.g., cause the distributed ledger host platform 103 to add the node accordingly, where the node may be monitored as described above and in further detail below. In some instances, the adaptive AI platform 102 may send the one or more instructions directing the distributed ledger host platform 103 to add the node to the miscellaneous distributed ledger via the communication interface 113 and while the second wireless data connection is established.

At step 212, the adaptive AI platform 102 may send a notification to the user device 104 indicating whether or not the node addition request was accepted. For example, the adaptive AI platform 102 may send the notification via the communication interface and while the first wireless data connection is established. In some instances, the adaptive AI platform 102 may also send one or more commands directing the user device 104 to display the notification, which may, e.g., cause the adaptive AI platform 102 to display the notification. For example, in arrangements in which the node addition request was not accepted, the adaptive AI platform 102 may cause the user device 104 to display a graphical user interface similar to graphical user interface 605, which is illustrated in FIG. 6.

At step 213, the adaptive AI platform 102 may update the adaptive AI engine based on the confidence score, the addition score, a ledger to which the node was added, a response to the request to add the node, and/or other information. In doing so, the adaptive AI platform 102 may continue to refine the adaptive AI engine using a dynamic feedback loop, which may, e.g., increase the accuracy and effectiveness of the engine in securely orchestrating the addition of nodes to distributed ledgers. For example, the adaptive AI platform 102 may reinforce, modify, and/or otherwise update the adaptive AI engine thus causing the engine to continuously improve.

In some instances, the adaptive AI platform 102 may continuously refine the adaptive AI engine. In some instances, the adaptive AI platform 102 may maintain an accuracy threshold for the adaptive AI engine, and may pause refinement (through the dynamic feedback loops) of the engine if the corresponding accuracy is identified as greater than the corresponding accuracy threshold. Similarly, if the accuracy fails to be equal or less than the given accuracy threshold, the adaptive AI platform 102 may resume refinement of the engine through the corresponding dynamic feedback loop.

While steps 201-213 describe the initial addition of a node to a particular distributed ledger, steps 214-220 describe node demotion between ledgers, and steps 221-227 describe node promotion between ledgers. For example, as is described further below, once a node has been added to a ledger, it may be dynamically monitored, and promoted or demoted between ledgers based on a current confidence in the node.

Figure 2D:
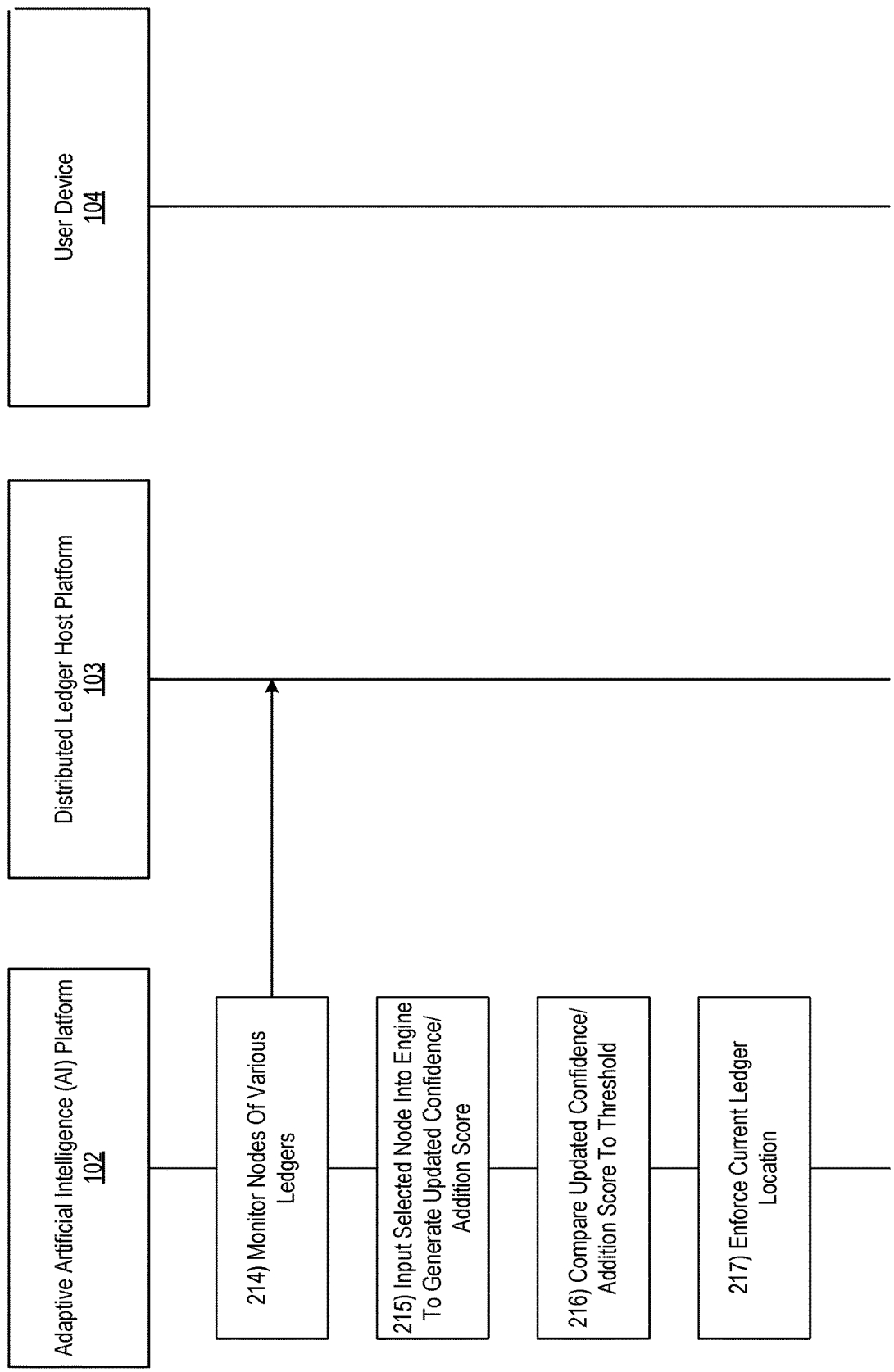

Referring to FIG. 2D, at step 214, the adaptive AI platform 102 may communicate with the distributed ledger host platform 103 to monitor the nodes of the various category specific distributed ledgers. In some instances, the adaptive AI platform 102 may select a particular node for evaluation. For example, the adaptive AI platform 102 may select the node using random selection, based on a preset time interval (e.g., at which all nodes should be evaluated, and/or otherwise).

At step 215, the adaptive AI platform 102 may input an IP address of the selected node into the adaptive AI engine to generate an updated confidence and/or addition score for the node. For example, the adaptive AI platform may use the adaptive AI engine to produce an updated confidence and/or addition score for the node using the methods and techniques described above at steps 205 and 206.

At step 216, the adaptive AI platform 102 may identify a relevant confidence and/or addition threshold, and compare the updated confidence and/or addition score to the threshold accordingly. For example, the adaptive AI platform 102 may identify the threshold and perform the comparison using the methods and techniques described above at steps 207/209. If the adaptive AI platform 102 identifies that the confidence and/or addition score meets or exceeds the relevant threshold, the adaptive AI platform 102 may proceed to step 217. Otherwise, if the adaptive AI platform 102 identifies that the confidence and/or addition score does not meet or exceed the relevant threshold, the adaptive AI platform 102 may proceed to step 218.

At step 217, the adaptive AI platform 102 may communicate with the distributed ledger host platform 103 to enforce the location of the node. For example, the adaptive AI platform 102 may enforce the location of the node, as its corresponding confidence continues to meet or exceed what is acceptable for the relevant categorized distributed ledger. The adaptive AI platform 102 may then proceed to step 221.

Figure 2E:
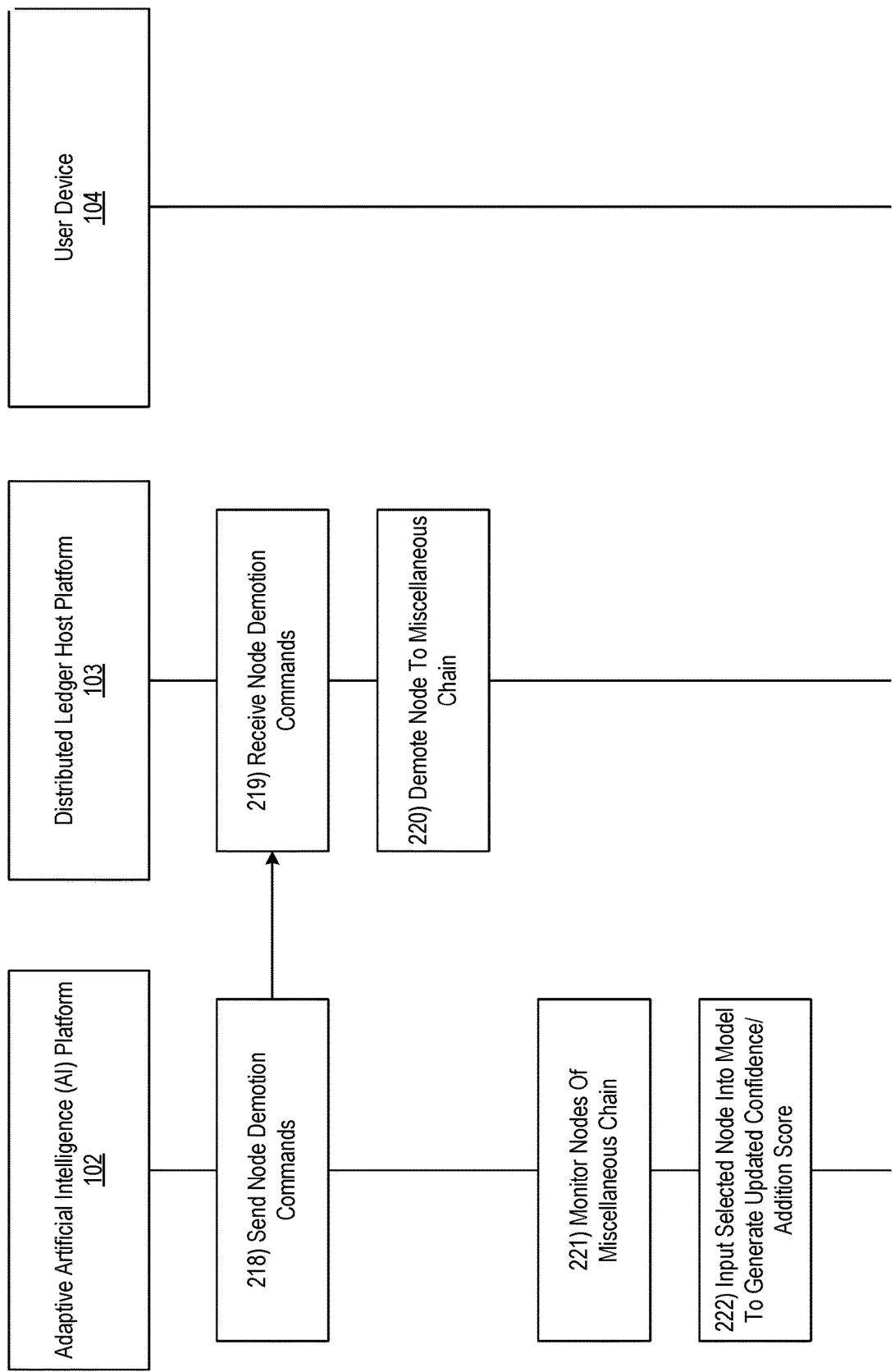

Referring to FIG. 2E, at step 218, the adaptive AI platform 102 may communicate with the distributed ledger host platform 103 to send node demotion commands. For example, the adaptive AI platform 102 may send one or more commands directing the distributed ledger host platform 103 to demote the node from the relevant categorized distributed ledger to the miscellaneous distributed ledger (e.g., as its corresponding confidence fails to now meet or exceed what is acceptable for the relevant categorized distributed ledger). In some instances, the adaptive AI platform 102 may send the one or more commands directing the distributed ledger host platform 103 to demote the node via the communication interface 113 and while the second wireless data connection is established.

At step 219, the distributed ledger host platform 103 may receive the node demotion commands sent at step 218. For example, the distributed ledger host platform 103 may receive the node demotion commands from the adaptive AI platform 102 while the second wireless data connection is established.

At step 220, based on or in response to the node demotion commands received at step 219, the distributed ledger host platform 103 may demote the node from the relevant categorized distributed ledger to the miscellaneous distributed ledger. For example, the distributed ledger host platform 103 may revoke access from the node to the categorized distributed ledger, and cause the node to interact with the miscellaneous ledger.

In some instances, in addition or as an alternative to demoting the node due to a decreased confidence level of the node (as is described above), the node may be demoted due to a change in event or information type (e.g., the node is sending requests directed to the category of a different distributed ledger such as operational requests rather than transactional requests, or the like). Additionally or alternatively, the node may be demoted due to a current processing load on the category specific distributed ledger (e.g., resources of the node might not be needed at the current time). In these instances, the available nodes for processing may be dynamically throttled up and/or down the nodes added to a given category specific distributed ledger (e.g., from the miscellaneous distributed ledger) based on the current or forecasted processing load, or the like. In instances where the node is demoted for these reasons (rather than a decreased confidence level), the adaptive AI platform 102 may maintain this information and/or otherwise update the adaptive AI engine based on this information.

As noted above, while steps 214-220 describe node demotion from a category specific distributed ledger to the miscellaneous ledger, steps 221-227 describe node promotion from the miscellaneous ledger to a category specific distributed ledger.

For example, at step 221, the adaptive AI platform 102 may communicate with the distributed ledger host platform 103 to monitor the nodes of the miscellaneous distributed ledger. In some instances, the adaptive AI platform 102 may select a particular node for evaluation. For example, the adaptive AI platform 102 may select the node using random selection, based on a preset time interval (e.g., at which all nodes should be evaluated, and/or otherwise).

At step 222, the adaptive AI platform 102 may input an IP address of the selected node into the adaptive AI engine to generate an updated confidence and/or addition score for the node. For example, the adaptive AI platform 102 may use the adaptive AI engine to produce an updated confidence and/or addition score for the node using the methods and techniques described above at step 215.

Referring to FIG. 2F, at step 223, the adaptive AI platform 102 may identify a relevant confidence and/or addition threshold, and compare the updated confidence and/or addition score to the threshold accordingly. For example, the adaptive AI platform 102 may perform actions similar to those described above at step 216. If the adaptive AI platform 102 identifies that the confidence and/or addition score meets or exceeds the relevant threshold, the adaptive AI platform 102 may proceed to step 225. Otherwise, if the adaptive AI platform 102 identifies that the confidence and/or addition score does not meet or exceed the relevant threshold, the adaptive AI platform 102 may proceed to step 224.

At step 224, the adaptive AI platform 102 may communicate with the distributed ledger host platform 103 to enforce the location of the node in the miscellaneous ledger. For example, the adaptive AI platform 102 may enforce the location of the node, as its corresponding confidence continues failing to meet or exceed what is acceptable for the relevant categorized distributed ledger.

At step 225, the adaptive AI platform 102 may communicate with the distributed ledger host platform 103 to send node promotion commands. For example, the adaptive AI platform 102 may send one or more commands directing the distributed ledger host platform 103 to promote the node from the miscellaneous distributed ledger to the relevant categorized distributed ledger (e.g., as its corresponding confidence now meets or exceeds what is acceptable for the relevant categorized distributed ledger). In some instances, the adaptive AI platform 102 may send the one or more commands directing the distributed ledger host platform 103 to promote the node via the communication interface 113 and while the second wireless data connection is established.

At step 226, the distributed ledger host platform 103 may receive the node promotion commands sent at step 225. For example, the distributed ledger host platform 103 may receive the node promotion commands from the adaptive AI platform 102 while the second wireless data connection is established.

At step 227, based on or in response to the node promotion commands received at step 226, the distributed ledger host platform 103 may promote the node from the miscellaneous distributed ledger to the relevant categorized distributed ledger. For example, the distributed ledger host platform 103 may grant access from the node to the categorized distributed ledger.

Figure 3:
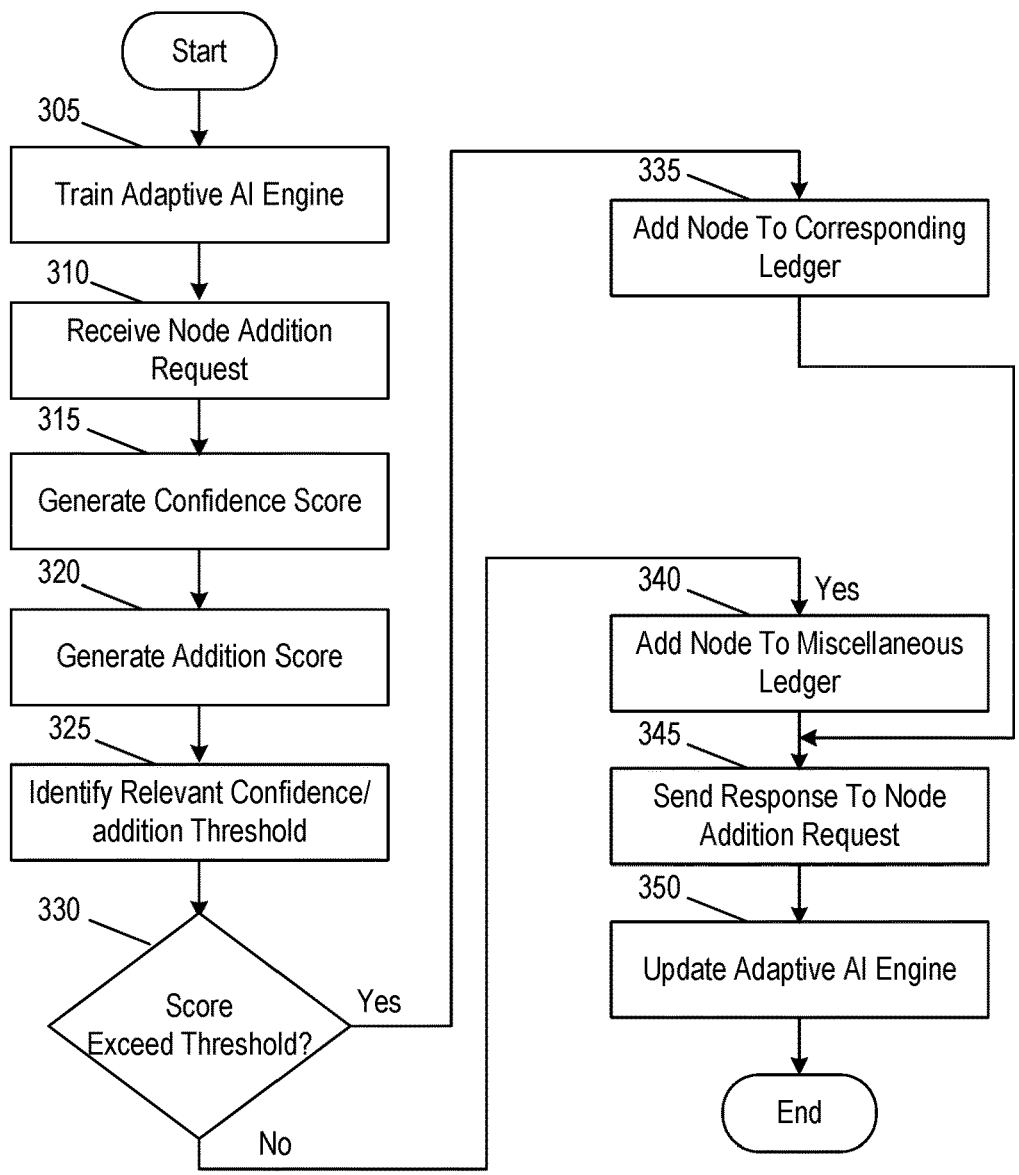
FIGS. 3-5 depict illustrative methods for using adaptive AI to securely orchestrate nodes in a distributed ledger hierarchy in accordance with one or more example embodiments.

FIG. 3 depicts an illustrative method for using adaptive AI to securely orchestrate nodes in a distributed ledger hierarchy in accordance with one or more example embodiments. Referring to FIG. 3, at step 305, a computing platform comprising one or more processors, memory, and a communication interface may train an adaptive AI engine to identify a confidence score corresponding to various nodes and a distributed ledger with which the nodes may interact. At step 310, the computing platform may receive a node addition request, requesting ledger access, from a node. At step 315, the computing platform may generate a confidence score for the node. At step 320, the computing platform may generate an addition score for the node. At step 325, the computing platform may identify a relevant confidence and/or addition threshold for the node. At step 330, the computing platform may identify whether or not the confidence and/or addition score exceeds the relevant confidence and/or addition threshold. If the computing platform does meet or exceed the threshold, the computing platform may proceed to step 335. For example, at step 335, the computing platform may communicate with a distributed ledger host platform to add the node to a category specific distributed ledger.

Otherwise, if the confidence or addition score does not exceed the threshold, the computing platform may proceed to step 340. For example, at step 340, the computing platform may communicate with the distributed ledger host platform to add the node to a miscellaneous distributed ledger. At step 345, the computing platform may send a response to the node addition request, indicating a ledger to which the node was added. At step 350, the computing platform may update the adaptive AI engine based on the scores, selected ledger, and/or other information.

Figure 4:
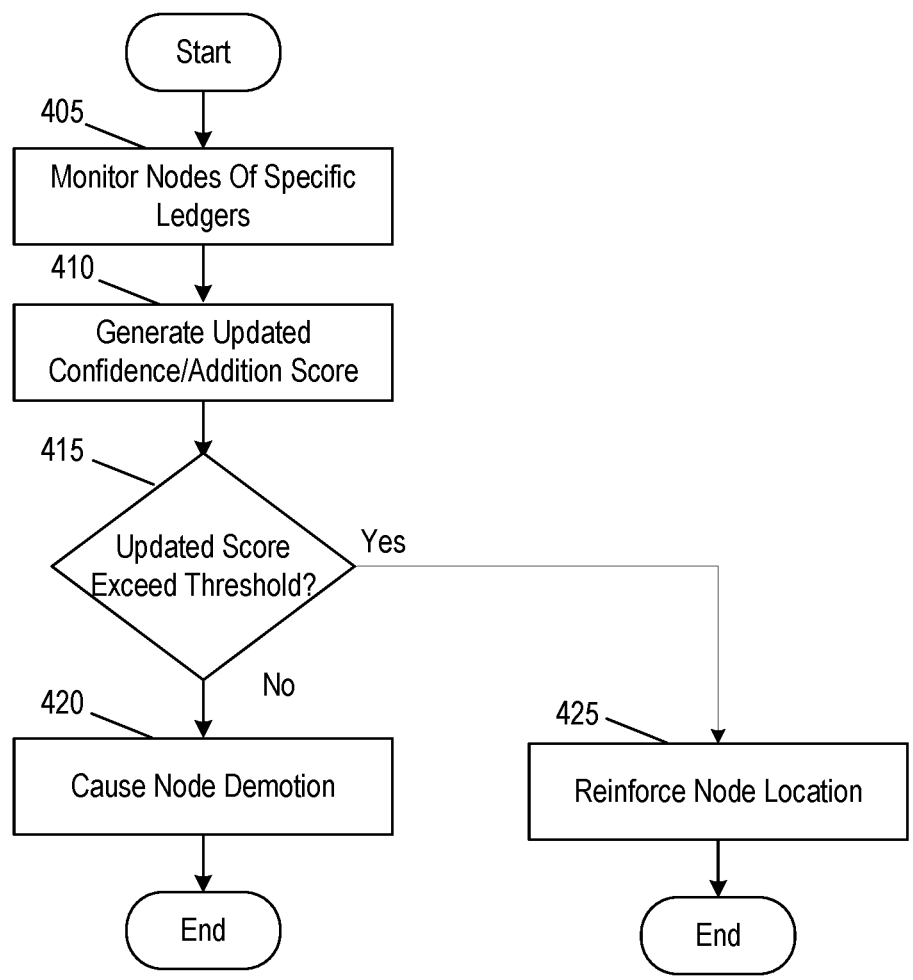

FIG. 4 depicts an illustrative method for using adaptive AI to securely orchestrate nodes in a distributed ledger hierarchy in accordance with one or more example embodiments. Referring to FIG. 4, at step 405, a computing platform comprising one or more processors, memory, and a communication interface may monitor nodes of category specific distributed ledgers. At step 410, the computing platform may generate an updated confidence and/or addition score for a selected node. At step 415, the computing platform may identify whether or not the updated score exceeds the relevant threshold. If the updated score fails to meet or exceed the threshold, the computing platform may proceed to step 420. At step 420, the computing platform may communicate with the distributed ledger host platform to demote the node from the category specific distributed ledger to a miscellaneous distributed ledger.

If the updated score meets or exceeds the threshold, the computing platform may proceed to step 425. At step 425, the computing platform may communicate with the distributed ledger host platform to reinforce the node location.

Figure 5:
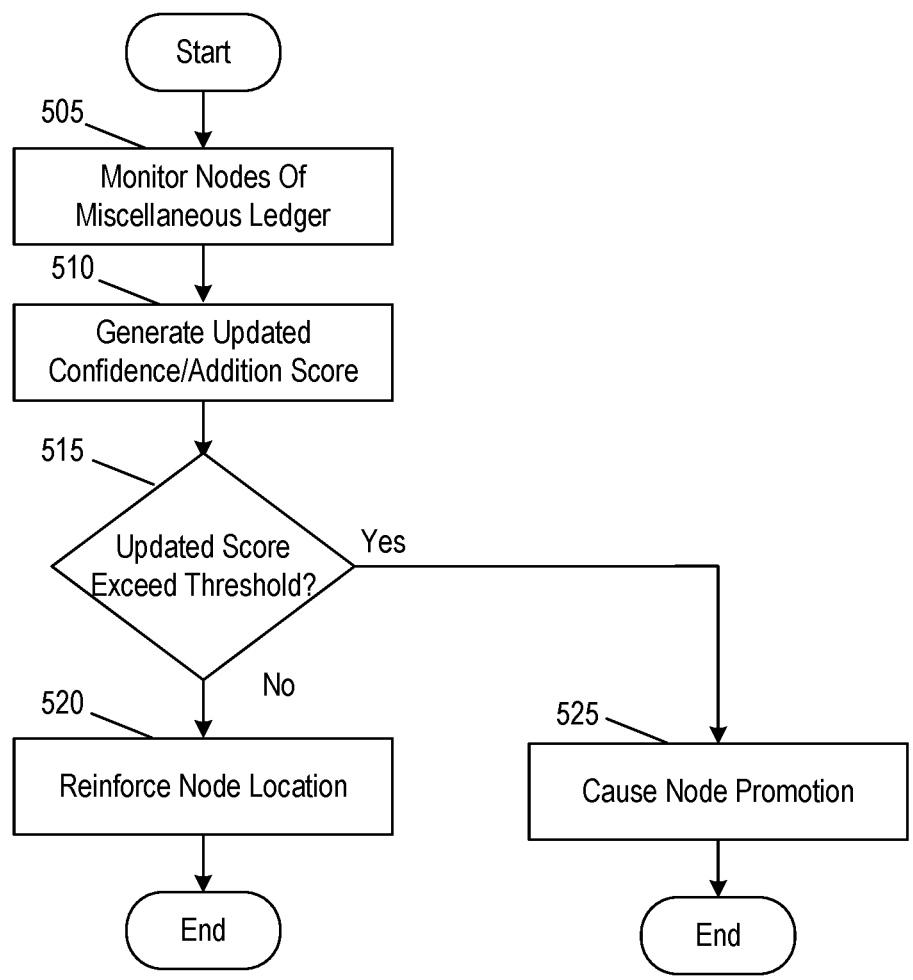

FIG. 5 depicts an illustrative method for using adaptive AI to securely orchestrate nodes in a distributed ledger hierarchy in accordance with one or more example embodiments. Referring to FIG. 5, at step 505, a computing platform comprising one or more processors, memory, and a communication interface may monitor nodes of a miscellaneous distributed ledger. At step 510, the computing platform may generate an updated confidence and/or addition score for a selected node. At step 515, the computing platform may identify whether or not the updated score exceeds the relevant threshold. If the updated score fails to meet or exceed the threshold, the computing platform may proceed to step 520. At step 520, the computing platform may communicate with the distributed ledger host platform to reinforce the node location at the miscellaneous distributed ledger.

If the updated score meets or exceeds the threshold, the computing platform may proceed to step 525. At step 525, the computing platform may communicate with the distributed ledger host platform to promote the node from the miscellaneous distributed ledger from the miscellaneous distributed ledger to the relevant category specific distributed ledger.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
      train, using historical ledger information and historical node confidence information, an adaptive artificial intelligence (AI) engine, wherein training the adaptive AI engine configures the adaptive AI engine to output, for a given input node, a particular distributed ledger of a plurality of distributed ledgers, to which the given input node should be added;

receive a request to add a first node to one of the plurality of distributed ledgers;
input first node information, of the first node, into the adaptive AI engine, wherein inputting the first node information causes the adaptive AI engine to output a node addition score indicating a first distributed ledger, of the plurality of distributed ledgers, corresponding to an information type of the request;
compare the node addition score to a node addition threshold, wherein the node addition threshold is specific to the first distributed ledger;
based on identifying that the node addition score meets or exceeds the node addition threshold, cause the first node to be added to the first distributed ledger; and
update, using a dynamic feedback loop and based on the node addition score, the adaptive AI engine.

2. The computing platform of claim 1, wherein the historical ledger information comprises information indicating ledgers on which historical requests from various nodes are processed.

3. The computing platform of claim 1, wherein the historical node confidence information indicates, for various nodes, one or more of: results of previous interactions of the various nodes, formats of information sent by the various nodes, indications of malware sent by the various nodes, indications of unrequested files being sent, validity of requests from the various nodes, encryption associated with the requests from the various nodes, or node behavior information.

4. The computing platform of claim 1, wherein the plurality of distributed ledgers includes:
at least one category specific ledger, wherein entries to the at least one category specific ledger are specific to a particular information type, and
a miscellaneous ledger, wherein entries to the miscellaneous ledger correspond to a plurality of different information types.

5. The computing platform of claim 1, wherein the first node information comprises an IP address of the first node.

6. The computing platform of claim 1, wherein generating the node addition score comprises:
generating a confidence score for the first node, wherein the confidence score indicates a representation of confidence that the first node comprises a secure node,
identifying a likelihood that the first node should be added to a particular distributed ledger, and
generating a combined score based on the confidence score and the likelihood.

7. The computing platform of claim 1, wherein the memory stores additional computer readable instructions that, when executed by the at least one processor, cause the computing platform to:
after adding the first node to the first distributed ledger, continue monitoring of the first node, wherein the continued monitoring comprises:
generating an updated addition score for the first node, comparing the updated addition score to the node addition threshold,
based on identifying that the updated addition score meets or exceeds the node addition threshold, reinforcing a location of the first node in the first distributed ledger, and
based on identifying that the updated addition score fails to meet or exceed the node addition threshold, demoting the first node from the first distributed ledger to a miscellaneous distributed ledger.

8. The computing platform of claim 7, wherein generating the updated addition score comprises one or more of:
reclassifying the first node to a different information type, wherein the different information type corresponds to a different distributed ledger, or
identifying that a trustworthiness of the first node has changed.

9. The computing platform of claim 1, wherein the memory stores additional computer readable instructions that, when executed by the at least one processor, cause the computing platform to:
monitor a second node of a miscellaneous distributed ledger;
generate an updated node addition score for the second node;
compare the updated addition score for the second node to the node addition threshold;
based on identifying that the updated addition score meets or exceeds the node addition threshold, promote the second node from the miscellaneous distributed ledger to the first distributed ledger; and
based on identifying that the updated addition score of the second node fails to meet or exceed the node addition threshold, reinforce a location of the second node in the miscellaneous ledger.

10. The computing platform of claim 1, wherein the memory stores additional computer readable instructions that, when executed by the at least one processor, cause the computing platform to:
dynamically adjust nodes of the first distributed ledger based on current processing load corresponding to the first distributed ledger, wherein dynamically adjusting the nodes comprises one or more of:
moving the first node from the first distributed ledger to a miscellaneous distributed ledger, or
moving a second node, from the miscellaneous distributed ledger, to the first distributed ledger.

11. A method comprising:
at a computing platform comprising at least one processor, a communication interface, and memory:
training, using historical ledger information and historical node confidence information, an adaptive artificial intelligence (AI) engine, wherein training the adaptive AI engine configures the adaptive AI engine to output, for a given input node, a particular distributed ledger of a plurality of distributed ledgers, to which the given input node should be added;
receiving a request to add a first node to one of the plurality of distributed ledgers;
inputting first node information, of the first node, into the adaptive AI engine, wherein inputting the first node information causes the adaptive AI engine to output a node addition score indicating a first distributed ledger, of the plurality of distributed ledgers, corresponding to an information type of the request;
comparing the node addition score to a node addition threshold, wherein the node addition threshold is specific to the first distributed ledger;
based on identifying that the node addition score meets or exceeds the node addition threshold, causing the first node to be added to the first distributed ledger; and
updating, using a dynamic feedback loop and based on the node addition score, the adaptive AI engine.

12. The method of claim 11, wherein the historical ledger information comprises information indicating ledgers on which historical requests from various nodes are processed.

13. The method of claim 11, wherein the historical node confidence information indicates, for various nodes, one or more of: results of previous interactions of the various nodes, formats of information sent by the various nodes, indications of malware sent by the various nodes, indications of unrequested files being sent, validity of requests from the various nodes, encryption associated with the requests from the various nodes, or node behavior information.

14. The method of claim 11, wherein the plurality of distributed ledgers includes:
at least one category specific ledger, wherein entries to the at least one category specific ledger are specific to a particular information type, and
a miscellaneous ledger, wherein entries to the miscellaneous ledger correspond to a plurality of different information types.

15. The method of claim 11, wherein the first node information comprises an IP address of the first node.

16. The method of claim 11, wherein generating the node addition score comprises:
generating a confidence score for the first node, wherein the confidence score indicates a representation of confidence that the first node comprises a secure node,
identifying a likelihood that the first node should be added to a particular distributed ledger, and
generating a combined score based on the confidence score and the likelihood.

17. The method of claim 11, further comprising:
after adding the first node to the first distributed ledger, continuing to monitor the first node, wherein the continued monitoring comprises:
generating an updated addition score for the first node,
comparing the updated addition score to the node addition threshold,
based on identifying that the updated addition score meets or exceeds the node addition threshold, reinforcing a location of the first node in the first distributed ledger, and
based on identifying that the updated addition score fails to meet or exceed the node addition threshold, demoting the first node from the first distributed ledger to a miscellaneous distributed ledger.

18. The method of claim 17, wherein generating the updated addition score comprises one or more of:
reclassifying the first node to a different information type, wherein the different information type corresponds to a different distributed ledger, or
identifying that a trustworthiness of the first node has changed.

19. The method of claim 11, further comprising:
monitoring a second node of a miscellaneous distributed ledger;
generating an updated node addition score for the second node;
comparing the updated addition score for the second node to the node addition threshold;
based on identifying that the updated addition score meets or exceeds the node addition threshold, promoting the second node from the miscellaneous distributed ledger to the first distributed ledger; and
based on identifying that the updated addition score of the second node fails to meet or exceed the node addition threshold, reinforcing a location of the second node in the miscellaneous ledger.

20. One or more non-transitory computer-readable media storing instructions that, when executed by a computing platform comprising at least one processor, a communication interface, and memory, cause the computing platform to:
train, using historical ledger information and historical node confidence information, an adaptive artificial intelligence (AI) engine, wherein training the adaptive AI engine configures the adaptive AI engine to output, for a given input node, a particular distributed ledger of a plurality of distributed ledgers, to which the given input node should be added;
receive a request to add a first node to one of the plurality of distributed ledgers;
input first node information, of the first node, into the adaptive AI engine, wherein inputting the first node information causes the adaptive AI engine to output a node addition score indicating a first distributed ledger, of the plurality of distributed ledgers, corresponding to an information type of the request;
compare the node addition score to a node addition threshold, wherein the node addition threshold is specific to the first distributed ledger;
based on identifying that the node addition score meets or exceeds the node addition threshold, cause the first node to be added to the first distributed ledger; and
update, using a dynamic feedback loop and based on the node addition score, the adaptive AI engine.

* * * * *